United States Patent [19]
Carr

[11] Patent Number: 5,722,289
[45] Date of Patent: Mar. 3, 1998

[54] COOKING APPLIANCE WITH LEVEL DETECTION APPARATUS AND METHOD

[75] Inventor: Larry L. Carr, Chesterland, Ohio

[73] Assignee: Tridelta Industries, Inc., Mentor, Ohio

[21] Appl. No.: 630,440

[22] Filed: Apr. 11, 1996

[51] Int. Cl.$^6$ ................................................. G01F 23/00
[52] U.S. Cl. .............................. 73/302; 73/303; 99/342
[58] Field of Search .............................. 73/299, 302, 303, 73/293; 99/342, 343, 344

[56] References Cited

U.S. PATENT DOCUMENTS

| | | | |
|---|---|---|---|
| B1 463,473 | 3/1976 | Borst | 73/302 |
| 1,560,111 | 11/1925 | Riedel | 73/303 |
| 1,675,698 | 7/1928 | Dienner | 73/303 |
| 1,723,681 | 8/1929 | Colman | 73/303 |
| 1,840,648 | 1/1932 | Wheeler | 73/303 |
| 4,192,186 | 3/1980 | Quinn | 73/303 |
| 4,409,833 | 10/1983 | Thomson et al. | 73/302 |
| 4,549,164 | 10/1985 | Tewfik | 73/303 X |
| 4,638,662 | 1/1987 | Watson | 73/302 |
| 4,639,738 | 1/1987 | Young et al. | 73/302 X |
| 4,669,309 | 6/1987 | Cornelius | 73/302 X |
| 4,949,070 | 8/1990 | Wetzel | 73/303 X |
| 5,059,954 | 10/1991 | Beldham et al. | 73/302 X |
| 5,347,863 | 9/1994 | Richard | 73/302 X |

FOREIGN PATENT DOCUMENTS

| | | | |
|---|---|---|---|
| 571143-A1 | 11/1993 | European Pat. Off. | 99/344 |
| 232931 | 6/1926 | United Kingdom | 73/303 |

*Primary Examiner*—Elizabeth L. Dougherty
*Assistant Examiner*—Paul D. Amrozowicz
*Attorney, Agent, or Firm*—Benesch, Friedlander Coplan & Arnoff LLP

[57] ABSTRACT

A deep fat fryer system includes a vat for holding a quantity of cooking medium. A tube or conduit is disposed between a position in the vat corresponding to a lower desired level of cooking medium in the vat and a blower for creating a vacuum in the tube. A pressure sensitive switch is disposed for sensing differences in pressure between the inside of the conduit and the outside of the conduit. The pressure sensitive switch provides an electrically detectable indication of when the difference in pressure between the inside of the conduit and the outside of the conduit is in excess of a predetermined difference in pressure indicative of cooking medium covering the end of the tube disposed in the vat.

25 Claims, 6 Drawing Sheets

COOKING APPLIANCE WITH LEVEL DETECTION APPARATUS AND METHOD

BACKGROUND OF THE INVENTION

This invention relates to a cooking appliance and the detection of a level of a fluid therein. It finds particular application in conjunction with deep fat fryers wherein level detection of a heated cooking medium is desired and will be described in conjunction therewith, however, it is to be appreciated that the invention may also find application in conjunction with other apparatus where liquid level detection is desired.

Typical commercial deep fat fryers find application in restaurants such as fast food chains wherein preparation of foods in a cooking medium such as hot fat or oil is common. Such fryers are utilized in the preparation foods such as french fires, hash browns, fish patties, chicken, and the like by placing the same into a basket and then lowering the basket into the cooking medium. When cooking is complete, the basket is removed from the cooking medium.

A typical commercial deep fat fryer includes a vat for holding the cooking medium at an elevated temperature, e.g., 350° F., for cooking a food product, a gas or electric heater for heating the cooking medium disposed in the vat, and a controller for controlling the heat applied to the cooking medium and for controlling the duration of time food product is cooked. When a gas heater is utilized to heat the cooking medium, a gas control valve is provided for on-off control of the gas being provided to burners which are disposed such that flames produced by ignited gas heats the cooking medium. To provide for ignition of gas provided to the burners, a constant pilot flame is provided or an ignition module is provided for igniting the gas concurrent with the providing of gas to the burners. For health reasons, the by-product of gas combustion is vented into an exhaust duct typically disposed in the back of the fryer. This exhaust duct in-turn directs the combustion by-products to a powered ventilation hood typically disposed over the fryer which in-turn directs the same to a filtration system and/or to an atmosphere outside the restaurant. Some deep fat fryers include an optional inducer blower disposed in the exhaust duct for urging the flow of combustion by-products towards the ventilation hood.

The ventilation hood, in addition to providing an exhaust path for the combustion by-products, also provides an exhaust path for moisture boiled off of the food during cooking or cooking medium evaporating during the operation of the fryer. In this manner, a part of such boiled off fluids are urged into the ventilation hood rather than allowing the same to condense on the fryers, other cooking appliances, the floor surrounding the fryers, storage racks and the like. In spite of the ventilation hood, however, some fat, oil, food product, dust and the like accumulate on or about the fryer and require occasional cleaning.

In deep fat fryers it is desirable to maintain the cooking medium at or above a minimum level so that food product is properly prepared therein, to optimize the useful life of the cooking medium and to avoid fire hazards from the operation of the fryer with less than a minimum level of cooking medium in the vat. Specifically, if the level of the cooking medium is below the minimum desired level, the introduction of a full load of food product therein, e.g. 3 lbs. of french fries, may result in a some of the food product not being completely immersed in the cooking medium and thus not being properly prepared. Moreover, preparing a relatively large amount of food product in a relatively small quantity of cooking medium reduces the useful life of the cooking medium thereby affecting the quality of food product prepared therein. Moreover, if the quantity of cooking medium is sufficiently low, the cooking medium cannot dissipate heat applied thereto by the heater sufficiently to avoid having the cooking medium ignite. In this respect, it is to be appreciated that a large quantity of cooking medium acts as a heat sink to dissipate energy applied thereto by the heater.

In prior art deep fat fryers, the level of the cooking medium is detected by an operator visually inspecting the level of the cooking medium in the vat. In light of the foregoing reasons for maintaining the level of the cooking medium at or a above a minimum level, however, concerns arise over potential lack of operator attention to the level of cooking medium in the cooking vat.

One attempt at providing automated detection of the level of the cooking medium in a deep fat fryer includes a stainless steel float. The float is designed to float on the surface of cooking medium disposed in the vat and engage a switch when the float, and consequently the cooking medium, is at or above a desired level. A problem with using such a float and switch combination, however, is that fat or oil boiled-off during operation of the fryer, coatings on food product prepared in the fryer, and dust and dirt in the environment accumulate on the switch and other elements comprising the level sensor and affect the operation thereof over time.

Other problems encountered with providing automated detection of the level of the cooking medium include the nominal temperature of the cooking medium is sufficiently hot enough, e.g. 350° F., that many conventional components utilized for level detection at or about room temperature are rendered unusable. Such components include, without limitation, relays formed with plastic housings, plastic floats, and the like containing materials that are unsuitable for use at such temperatures. Moreover, the need to provide a sterile cooking environment dictates the use of a material, such as stainless steel, that is readily sterilized and useable in a cooking environment without affecting the preparation or quality of the food product.

It is an object of the present invention to overcome these problems and other by providing a new and improved apparatus and method for sensing the level of a fluid.

SUMMARY OF THE INVENTION

In accordance with one facet of the invention, a fluid level sensor is provided. The level sensor includes a tube having a first and second ends and a vessel for holding a quantity of a fluid. The first end of the tube is disposed for receiving the fluid therein and the second end is disposed adjacent a means for creating a difference in pressure between the ends of the tube. A pressure sensitive switch is connected to the tube for sensing differences between pressure inside the tube and pressure outside the tube. The pressure sensitive switch provides an indication of when the sensed difference in pressure is greater than a predetermined difference in pressure.

In accordance with another aspect of the invention, the difference in pressure increases in response to increasing fluid level relative to the first end of the tube and the predetermined difference in pressure corresponds to the fluid substantially blocking the first end of the tube. The indication provided by the pressure sensitive switch is electrically detectable.

In accordance with yet another aspect of the invention, the pressure difference between the ends of the conduit is not sufficient to create a flow of fluid in the tube.

In accordance with still another aspect of the invention, the pressure difference between the ends of the conduit is not sufficient to substantially change of the level of the fluid in the tube relative to a level of the fluid in the vessel. The pressure sensitive switch is disposed relative to the level of the fluid in the tube so that the pressure difference between the ends of the conduit is insufficient to bring the switch and the fluid into contact.

In accordance with another facet of invention, a cooking appliance is provided. The cooking appliance includes a cooking vessel for holding a quantity of a cooking medium, a heating means for the heating the cooking medium, a temperature sensor for sensing temperature of the cooking medium, a controller for controlling the operation of the heating means as a function of the cooking medium temperature, and a level sensor for sensing a level of the cooking medium disposed in the cooking vessel. The level sensor includes a conduit having an end disposed for receiving cooking medium therein, a means for creating a flow of air in the conduit, and a means for sensing when the air flowing in the conduit is less than a predetermined amount and for providing an indication thereof to the controller.

In accordance with another aspect of the invention, the air flow in the conduit is related to the level of the cooking medium relative to the end of the conduit. Increasing the level of cooking medium relative to the end of the conduit decreases the flow of air in the conduit.

In accordance with another aspect of the invention, the air flow sensing means is separated from the cooking medium during operation of the air flow creating means. The air flow sensing means provides the indication when substantially no air flows in the conduit in response to cooking medium blocking the end of the conduit.

In accordance with another aspect of the invention, the air flow sensing means is a pressure sensitive switch disposed for sensing differences between pressure inside the conduit and pressure external to the conduit. The pressure inside the conduit is functionally related to the amount of air flowing in the conduit.

In accordance with another aspect of the invention, the cooking appliance is a deep fat fryer wherein the cooking medium is heated to a suitably high temperature for preparing a food product immersed therein to a desired comestability.

In accordance with another facet of the invention, a method of sensing a level of a cooking medium disposed in a cooking vessel is provided. In the method, a flow of air is created in a conduit having one end disposed for receiving cooking medium therein. A difference between pressure in the conduit and pressure external to the conduit is sensed and an indication is provided when the sensed difference exceeds a predetermined pressure difference.

In accordance with another aspect of the method, the predetermined pressure difference is related to the flow of air in the conduit being substantially eliminated in response to cooking medium blocking the end of the tube.

An advantage of the present invention is that it has few moving parts which are located away from the heated cooking medium.

Another advantage of the invention is that it is readily adaptable to existing deep fat fryer systems.

Still other advantages of the invention are that it is relatively inexpensive, highly reliable, relatively quiet in use and easy to use.

Still other advantages will become apparent upon reading and understanding the following detailed description.

BRIEF DESCRIPTION OF THE DRAWINGS

The invention may take form in various parts and arrangements of parts, and in various steps or arrangements of steps. The drawings are only for purposes of illustrating a preferred embodiment and are not to be construed as limiting the invention.

DETAILED DESCRIPTION OF THE PREFERRED EMBODIMENT

Figure 1:
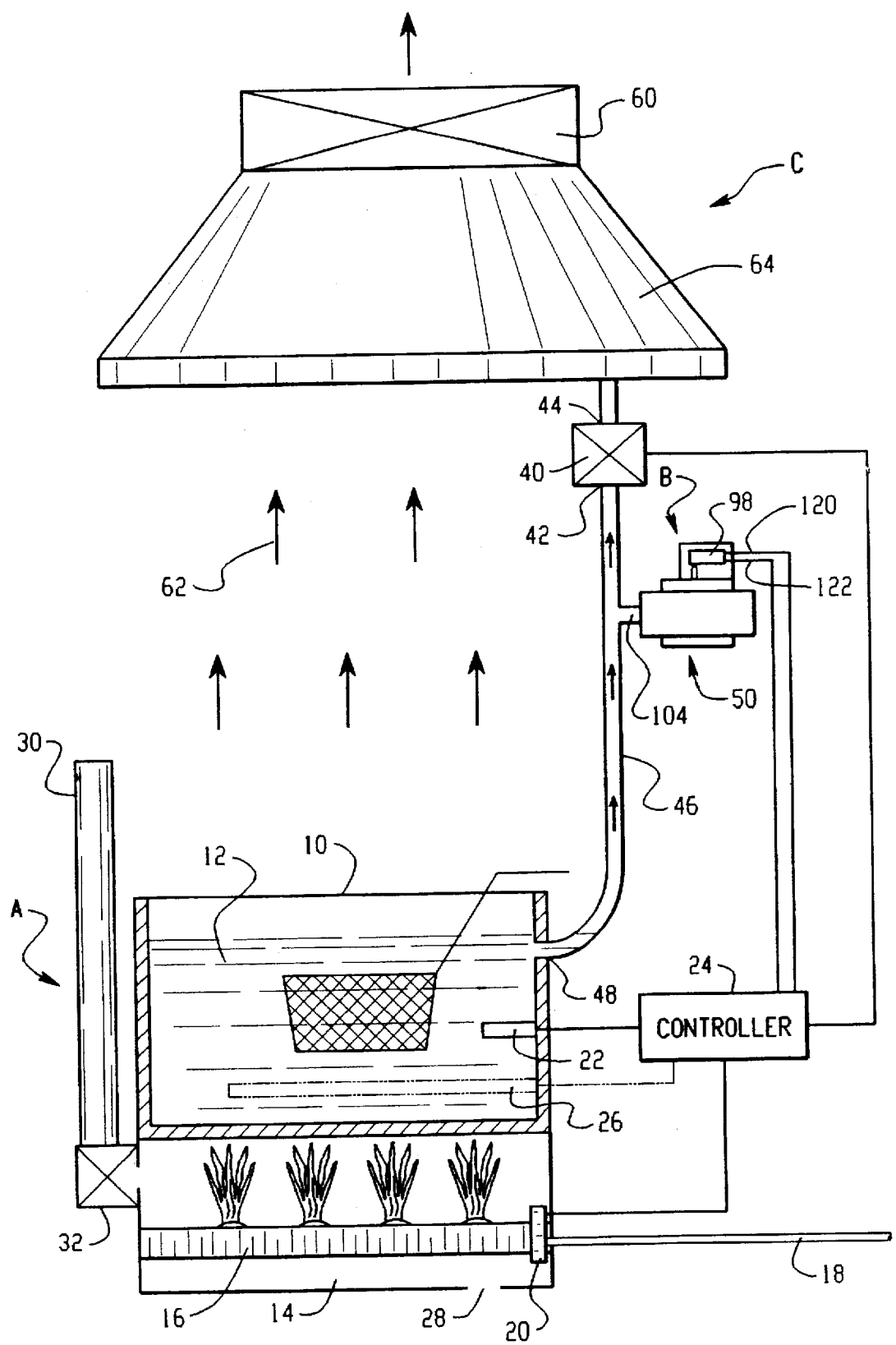
FIG. 1 is a diagrammatic illustration of a deep fat fryer system including a level sensor in accordance with a preferred embodiment of the present invention.

With reference to FIG. 1, a deep fat fryer system A is illustrated. A level sensor B in accordance with the present invention attached to the fryer system. A ventilation hood C is provided for venting cooking fumes, gas combustion by-products and the like away from the fryer system.

The fryer system includes a vat 10 for holding a quantity of a cooking medium 12. The vat is disposed above a combustion chamber 14 that includes a burner assembly 16 connected to a gas supply line 18 for providing a supply of combustible fuel, such as natural gas, propane and the like, to the burner assembly. A gas control valve 20 is disposed in the gas supply line for providing on-off control of the flow of gas to the burner assembly. A temperature sensor 22 of conventional design is disposed in the vat for sensing the temperature of the cooking medium disposed therein. A controller 24 is connected to the temperature sensor and the gas control valve for receiving the output of the temperature sensor and for controlling the temperature of the cooking medium by controlling the supply of gas to the burner. The controller further operates to determine the time to prepare food product disposed in the cooking medium as a function of the temperature of the cooking medium during the cooking cycle and to provide an indication when such food product is prepared to a desired comestability. In the preferred embodiment, the gas control valve includes an ignitor assembly for igniting gas in response to the controller activating the gas control valve to supply a flow of gas to the burner. In this manner, a flame is not present when gas is not being supplied to the burner. It is to be appreciated, however, that a pilot flame could alternatively be provided for igniting gas supplied to the burner assembly. Moreover, while a gas heated fryer system is illustrated, it is to be appreciated that the burners, gas control valve and gas supply line could be replaced by an electric heating element 26, shown in phantom, disposed in the vat and connected to a switchable supply of electricity under the control of the controller.

In the preferred embodiment, the fryer includes an air inlet 28 for providing a path for combustion air to enter the combustion chamber and an exhaust duct 30 for providing a path for by-products of gas-air combustion to be directed away from the fryer. In an alternate embodiment, the fryer includes an inducer motor 32 of conventional design for drawing ambient air into the combustion chamber and for urging combustion by-products into the exhaust duct.

The level sensor B includes a blower 40 having an inlet side 42 and an outlet side 44. In the preferred embodiment, the controller 24 is connected to the blower for controlling the operation thereof. This is not, however, to be construed as limiting the invention. A tube or conduit 46 is disposed between the inlet side of the blower and the vat. The vat end of the conduit is disposed at a location 48 in the vat corresponding to a desired level of cooking medium in the vat. Specifically, the vat end of the conduit is positioned in the vat so that cooking medium enters the conduit and blocks the end thereof when the cooking medium is at or above the desired level. The vat end of the conduit is also disposed so that cooking medium drains from the conduit when the level of the cooking medium drops below the end of the conduit. In this manner, cooking medium is not trapped in the conduit.

Because cooking medium and the inside of the conduit come into contact, it is desirable that at minimum the vat end of the conduit be made of material, such as, without limitation, stainless steel, that is compatible with the cooking medium at temperatures utilized to prepare food products. Moreover, it is desirable that the inside diameter of the tube be of sufficient size to avoid the collection and/or retention of debris, such as, breading, food product, and the like. Alternatively, the opening of the tube can be screened for similar protection. A pressure sensitive switch 50 is disposed for sensing differences between air pressure in the conduit and air pressure external to the conduit and for providing an electrical detectable indication of when such difference in pressure is at or above a desired value.

In the preferred embodiment, the blower operates to create a vacuum at the end of the conduit disposed adjacent the blower. In the absence of an obstruction, such as cooking medium, at the vat end of the conduit, the vacuum draws air through the conduit in a direction from the vat end of the conduit to the blower end of the conduit. The blower and conduit are designed so that the vacuum created in the conduit is not sufficient to draw cooking medium significantly upward into the conduit. In this manner the exposure of the switch 50 and blower 40 to cooking medium is limited to cooking medium evaporating into the conduit. Moreover, it is to be appreciated that the conduit could alternatively be designed with a trap, a filter or the like to further limit the exposure of the switch and blower to cooking medium.

The ventilation hood C includes an exhaust fan 60 for creating a flow 62 of cooking fumes, combustion by-products, water vapor boiled-off during cooking and the like away from the fryer and into a filtration system (not illustrated) and/or to an atmosphere away from the fryer, e.g., outside the restaurant. A canopy 64 is disposed between the fryer and the blower 60 for directing such flow towards the fan assembly.

Figure 2:
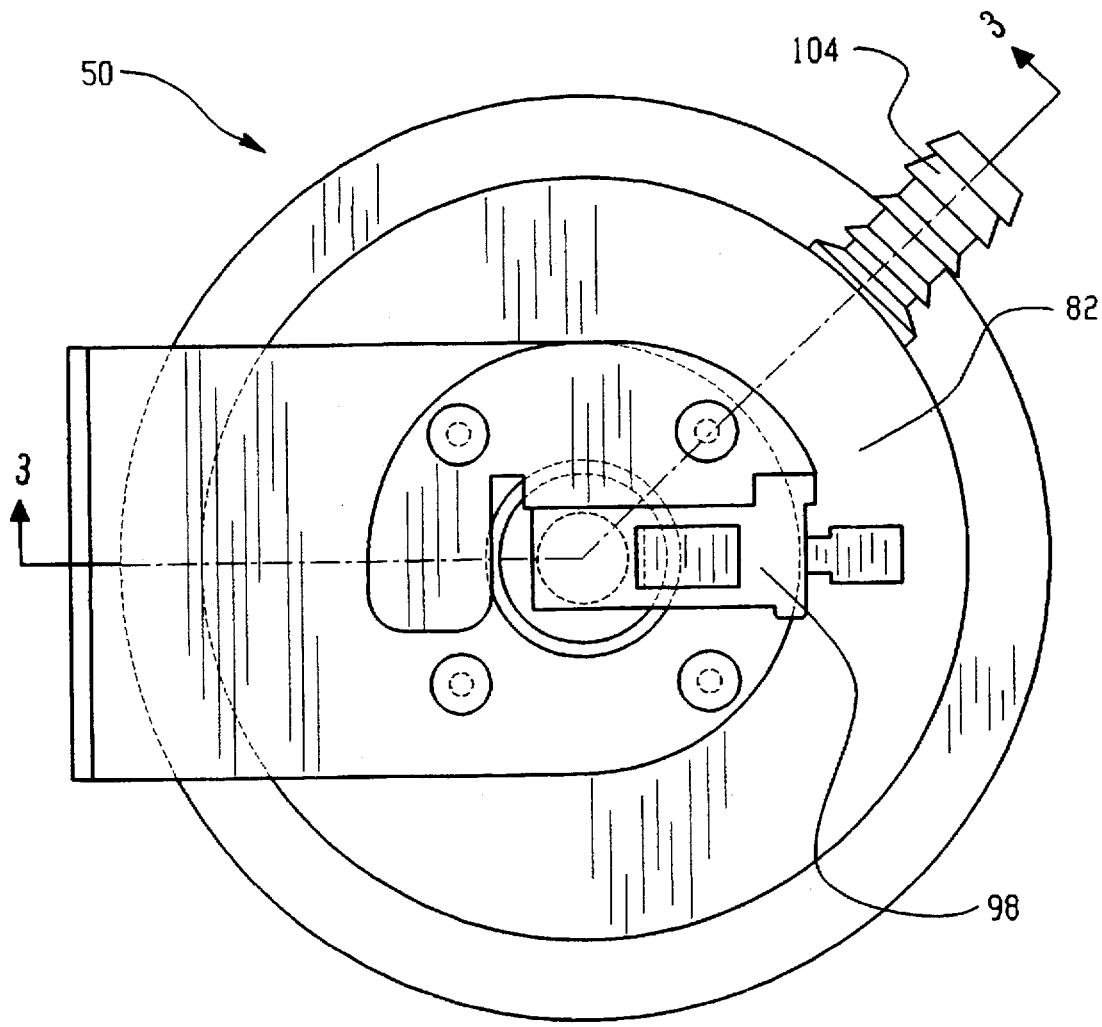
FIGS. 2 and 3 are illustrations of a pressure sensitive switch forming part of the level sensor of FIG. 1.
Figure 3:
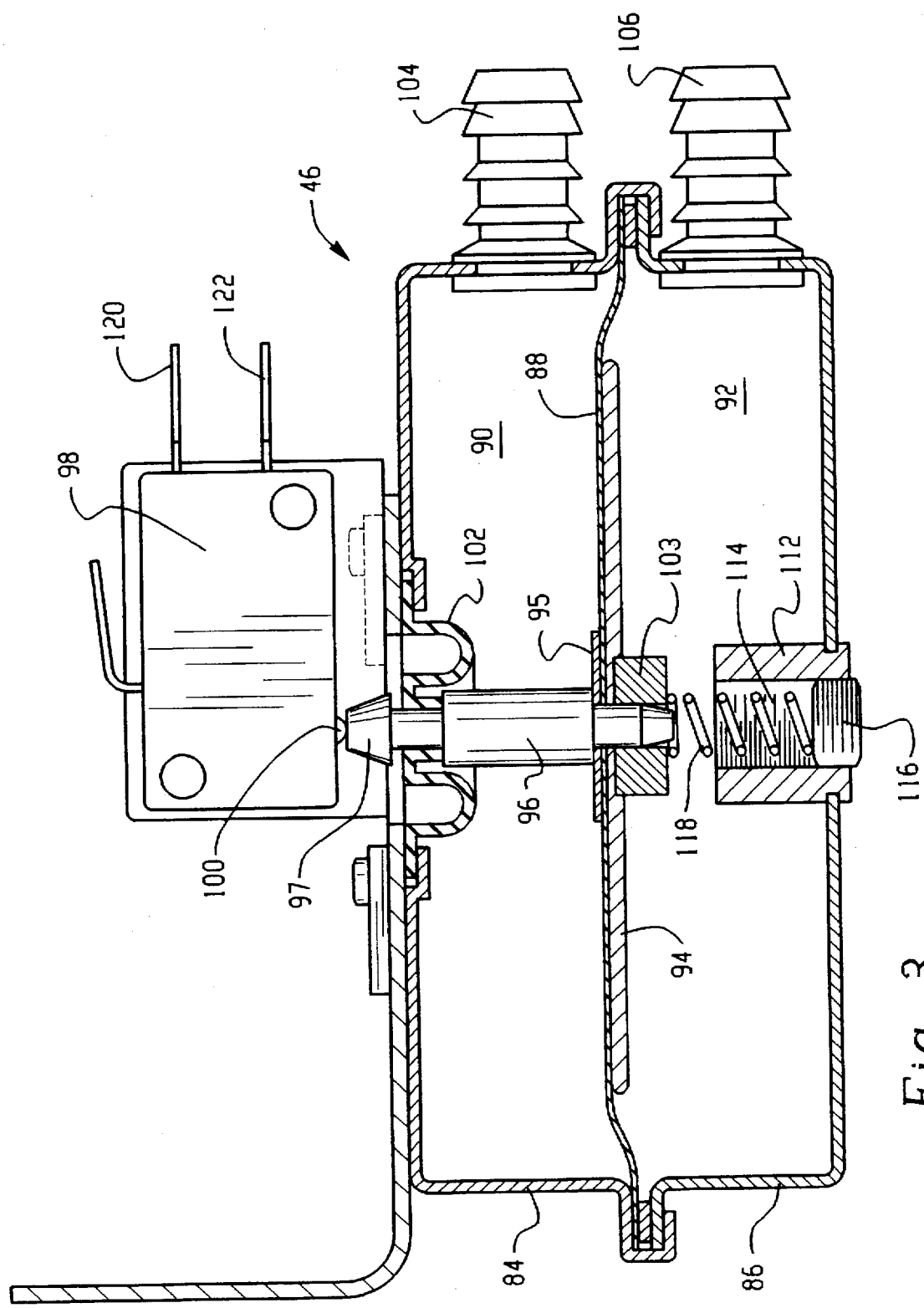

With reference to FIGS. 2 and 3, and with continuing reference to FIG. 1, a pressure sensitive switch 50 in accordance with the present invention is provided for the purpose of illustration and is not to be construed as limiting the present invention. The switch 50 includes a cylindrical housing 82 formed of upper and lower housing sections 84, 86. A diaphragm 88 is disposed between the housing sections to define and isolate upper and lower chambers 90, 92 within the housing. A central plate or disk 94 is positioned against one side of the diaphragm and a smaller plate 95 is positioned against the other side of the diaphragm. An actuating pin 96 extends through the central plate and the smaller plate and has an end for actuating a microswitch 98 of conventional design mounted exterior to the housing. The actuating pin extends through an opening formed in the housing and engages an actuator 100 on the microswitch. The end of the actuating pin engaging the actuator extends through a baffle 102 adapted to form a seal between the pin 96 and the upper housing 84. The end of the actuating pin opposite the actuator has a collar 103 attached thereto for securing the diaphragm to the actuating pin. First and second ports 104, 106 are attached to the housing for communicating with the first and second chambers 90, 92 respectively. The switch also includes a sleeve insert 112 having internal threaded bore 114 disposed in the lower housing section 86 for receiving set screw 116. A biasing spring 118 is disposed between the set screw and the smaller plate 95 for adjusting the bias on the diaphragm in response to adjustment of the set screw.

The pressure sensitive switch is designed to be responsive to slight differences in pressure, e.g. on the order of 8.4 mm water column, across the diaphragm so that the microswitch changes state in response to such differences in pressure. Specifically, the diaphragm urges the actuating pin against the actuator in response to pressure in the second chamber 92 side of the diaphragm being greater than pressure in the first chamber side 90 of diaphragm. When a sufficient difference in pressure exists across the diaphragm to overcome a spring tension associated with the diaphragm and the actuator of the microswitch, the pin causes the actuator to trigger thereby changing the state of contacts of the microswitch from a unactuated or relaxed state to an actuated or asserted state. The action of the actuator and contacts of such microswitch is well known in the art and should not be construed as limiting the present invention. Moreover, it is to be appreciated that the selection of the terms 'relaxed state' and 'asserted state' are for the purpose of facilitating a description of the invention and are not to be construed as an indication that the contacts are opened or closed. The state of the contacts is communicated external to the microswitch by terminals 120, 122 of microswitch 98. The terminals of the microswitch are connected to the controller for providing an electrically detectable indication of the state of the contacts. In the pressure sensitive switch set forth above, adjustment of set screw 116 provides for the triggering of the actuator to be calibrated to coincide with a desired difference in pressure existing across diaphragm 94. This, however, is not to be construed as a limitation of the invention.

In the preferred embodiment, the first port 104 of the pressure switch is in fluid communication with the interior of the conduit and the second port 106 (not illustrated) is in fluid communication with the exterior of the conduit, i.e., the atmosphere outside the conduit. Operating the blower 40 with the vat end of the conduit unobstructed by, for example, cooking medium produces in the conduit an negative pressure that is lower than the pressure outside the conduit. The first chamber of the switch 90, in fluid communication with the conduit, experiences this negative pressure relative to the second chamber of the switch in fluid communication with air pressure outside the conduit. This difference in pressure is impressed across the diaphragm which experiences a force, related to such difference in pressure, that acts to urge the actuating pin towards the actuator. The pressure switch is calibrated so that this force is insufficient cause the actuating pin to trigger the actuator of the microswitch. Thus, the contacts of the microswitch remain in a relaxed state.

Increasing the amount of cooking medium in the vat to a level above the opening of the conduit at the vat end thereof substantially eliminates air from being drawn into the conduit by blower 40. The vacuum created in the conduit by operation of the blower in the presence of cooking medium covering the vat end of the conduit produces a decrease in pressure inside the conduit relative to the pressure outside the conduit. The pressure switch is calibrated so that this difference in pressure produces on the diaphragm a force of sufficient extent to cause the actuating pin to trigger the actuator of the microswitch thereby causing the contacts of the microswitch to become asserted. The contacts being in an asserted state is interpreted by the controller as an indication that a desired level of cooking medium is present in the vat. In this manner, an electrically detectable indication is provided that the cooking medium is at a level sufficient to cover the vat end of the conduit.

If, however, the level of the cooking medium is such that the vat end of the conduit is not blocked thereby, air is drawn into the conduit and an insufficient pressure difference exists across the diaphragm to produce a force sufficient to cause pin 96 to trigger actuator 100. Accordingly, the contacts remain in a relaxed state which is interpreted by the controller as insufficient cooking medium being present in the vat. In similar manner, the pressure difference across diaphragm 94 decreases in response to the level of the cooking medium decreasing from a level blocking the vat end of the conduit to levels wherein air is drawn into the vat end of the conduit. As the pressure across the diaphragm decreases, the force applied to the actuating pin decreases until insufficient force exists to maintain the contacts in an asserted state. Accordingly, the contacts of the microswitch revert to a relaxed state which is interpreted by the controller as insufficient cooking medium being present in the vat. The controller, in response to the contacts being in such relaxed state, takes appropriate corrective action such as generating an audible or visual alarm and/or withholding the application of heat to the cooking medium until the level of the cooking medium is increased to a level detectable by the level sensor.

Figure 4:
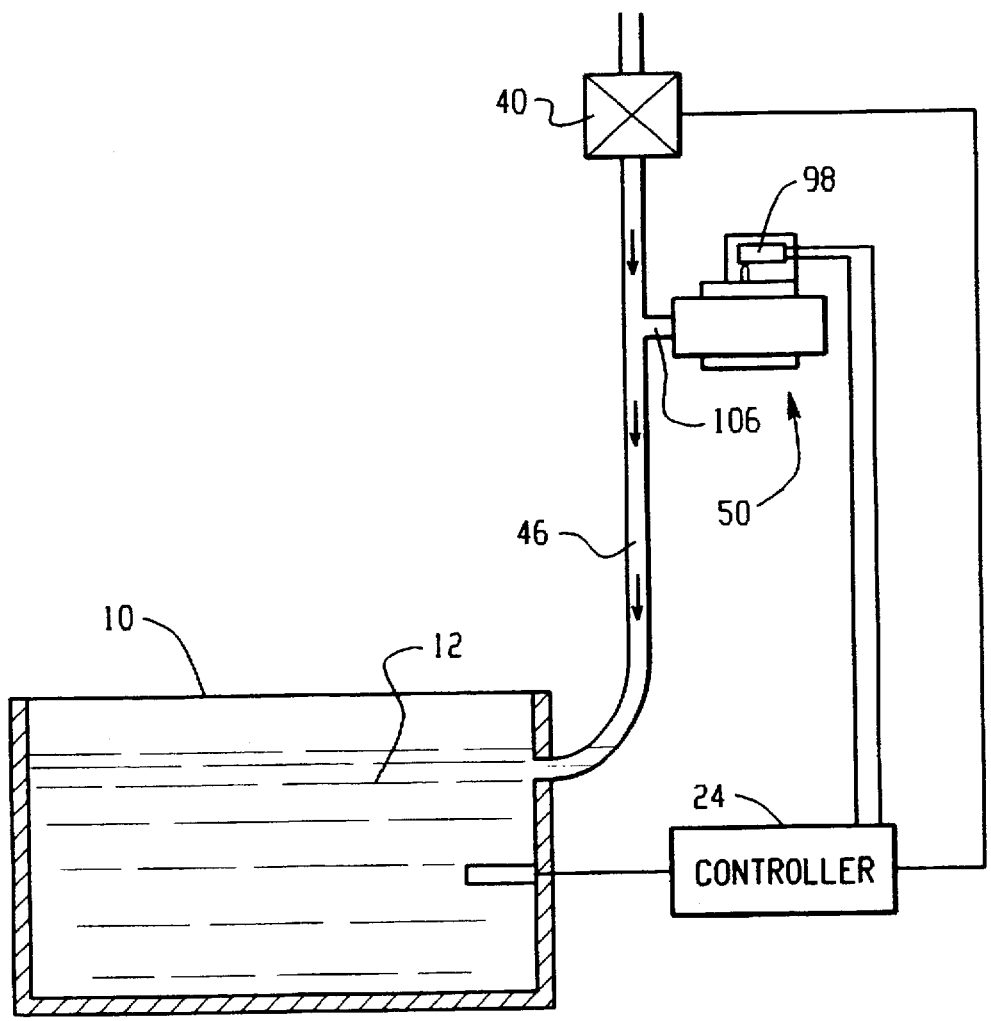
FIGS. 4–6 are diagrammatic illustration of a deep fat fryer system including a level sensor in accordance with alternate embodiments of the present invention.

With reference to FIG. 4, a level sensor in accordance with an alternate embodiment of the present invention is provided. In this embodiment the blower operates to create a positive pressure at the end of the conduit opposite the vat so that air is urged into the conduit in a direction from the blower to the vat 10, i.e., opposite the air flow direction of FIG. 1. To provide for sensing changes in static pressure in the conduit, the second port 106 of the pressure switch is disposed in fluid communication with the interior of the conduit and the first port 104 (not illustrated) is in fluid communication with atmosphere exterior the conduit. The operation of the blower in the presence of an obstruction, such as cooking medium, blocking the vat end of the conduit substantially eliminates the flow of air in the conduit. The substantial elimination of air flow in the conduit, permits the blower to produce in the conduit a pressure greater than the pressure outside the conduit. The difference in pressure between the inside of the conduit and the outside of the conduit is impressed across the diaphragm which experiences a force in the direction of the first chamber related to such difference in pressure. The force developed by the actuator in the presence of cooking medium blocking the vat end of the conduit is of sufficient extent to cause actuator pin 96 to trigger actuator 100 thereby changing the state of the contacts in microswitch 98 from a relaxed state to an asserted state. The contacts being in an asserted state is interpreted by the controller as an indication that a desired level of cooking medium is present in the vat.

Decreasing the level of the cooking medium so that the vat end of the conduit is not completely blocked thereby allows air to flow through the conduit and exit at the vat end of the conduit. In response to air flowing through the conduit, the inside of the conduit experiences a pressure greater than the pressure outside the conduit but less than the positive pressure limit experienced in the presence of an obstruction, i.e., cooking medium, covering the vat end of the conduit. This difference between the pressure inside the conduit and the pressure outside the conduit is impressed across the diaphragm which experiences a force, less than the force experienced thereby when cooking medium blocks the vat end of the conduit, that is not sufficient to cause pin 96 to trigger actuator 100. Thus, the contacts of the microswitch remain in their relaxed state. Moreover, ideally, this force is not sufficient to maintain the contacts in an asserted state when the level of the cooking medium decreases from a level blocking the vat end of the conduit to a level wherein air flows through the conduit.

In this later embodiment, it is desirable that the pressure produced in the conduit by the blower be of sufficient extent to cause the pressure sensitive switch to change from a relaxed state to an asserted state in response to cooking medium covering the end of the conduit. It is also desirable that the pressure produced in the conduit by the blower be of sufficiently small extent to avoid or minimize the introduction of bubbles of air into the cooking medium. To these ends, the diameter of the conduit, the size of the blower and the sensitivity of the pressure sensitive switch are selected to provide a balance between the need to provide sufficient pressure to cause the microswitch contacts to change state and the desire to avoid or minimize the introduction of air into the cooking medium. It is to be appreciated, however, that this not to be construed as limiting the invention.

As noted heretofore, the switch 50 of the present invention is sensitive to slight differences in air pressure across diaphragm 88. Moreover, such switches have a hysteresis associated therewith wherein the contacts of the microswitch change to their asserted state in response one pressure difference being impressed across the diaphragm, e.g., 8.4 mm water column, and revert back to their relaxed state in response to another, lower, pressure difference, e.g., 3.3 mm water column, being impressed across the diaphragm. Specifically the contacts remain asserted as the pressure difference across the diaphragm decreases from a higher pressure difference to a lower pressure difference. In this respect, it should be appreciated that the level sensor is ideally calibrated so that the contacts become asserted in response to the level of the cooking medium blocking the vat end of the conduit and revert back to the relaxed state in response to air passing through the conduit. In practice, however, a decrease in the level of the cooking medium from a level wherein the vat end of the conduit is blocked to a level wherein air flows therethrough may not result in the contacts changing immediately from an asserted state to a relaxed state. It is to be appreciated, however, that this hysteresis should not affect the effectiveness of the present invention providing the contacts revert to a relaxed state before the cooking medium decreases to a level below the vat end of the conduit. In this respect, it is to be appreciated that desirable levels of cooking medium in a deep fat fryer vary over a relatively wide range in relation to the range of acceptable cooking medium levels that would result in the contacts of the pressure switch changing states. Accordingly, in practice, the vat end of the conduit is disposed above a minimum desirable level of cooking medium in the vat and, in use of the present invention, the vat end of the conduit is typically blocked by cooking medium.

In the above described embodiments, the blower is connected to the controller for control thereby. Alternatively, the blower may be operated continuously so that an indication of the cooking medium being at or above a minimum desired level is provided continuously to the controller. In yet another alternative, the operation of the blower may be coordinated with the determination of the state of the contacts by the controller on a sampled basis. Specifically, the controller causes the blower to be energized in advance of sampling the state of the contacts so that the contacts have had the opportunity to change from a relax state to an asserted state in response to the operation of the blower. The controller then determines the state of the contacts. If the contacts are determined to be asserted, the controller deenergizes the blower and continues controlling other aspects of the fryer operation. If, however, the contacts are determined to be in their relaxed state, the controller concludes that insufficient cooking medium is present in the vat and appropriate corrective action is taken.

Figure 5:
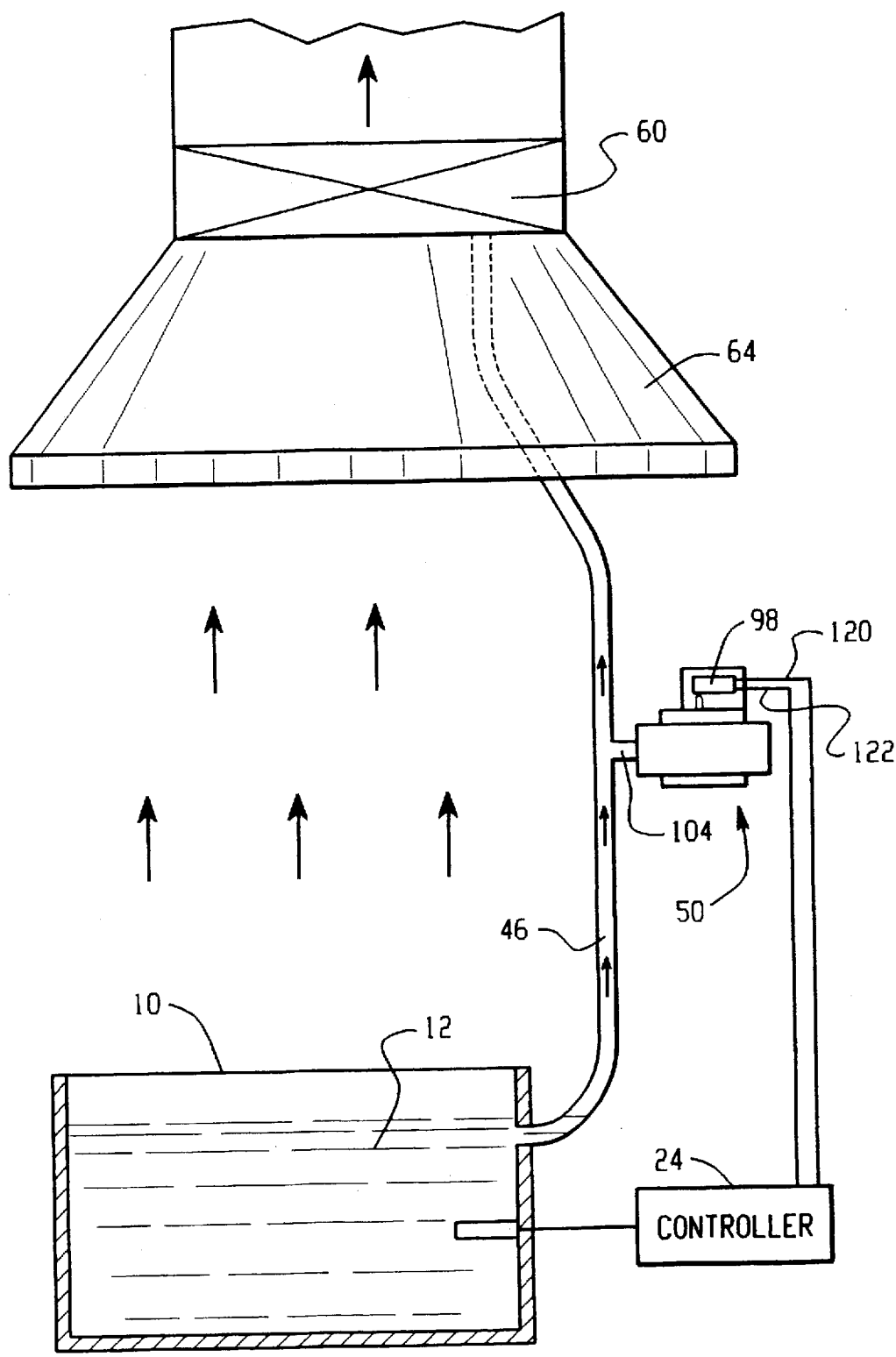

With reference to FIG. 5, in another alternate embodiment of the invention, conduit 46 is disposed between the vat 10 and the air inlet side of the exhaust fan 60. In this embodiment, the operation of the exhaust fan 60 creates a vacuum at the end of the conduit opposite the vat in a manner similar to the operation of the blower 50 in FIG. 1. Utilizing the exhaust fan in this manner permits blower 50 to be omitted while realizing the benefits of the present invention. Specifically, like the embodiment set forth in FIG. 1, pressure switch 50 is disposed for sensing differences in air pressure between the inside of the conduit and outside the conduit. These differences in pressure are impressed across the diaphragm of the pressure switch and utilized to determine when a sufficient level of the cooking medium is present in the vat.

Figure 6:
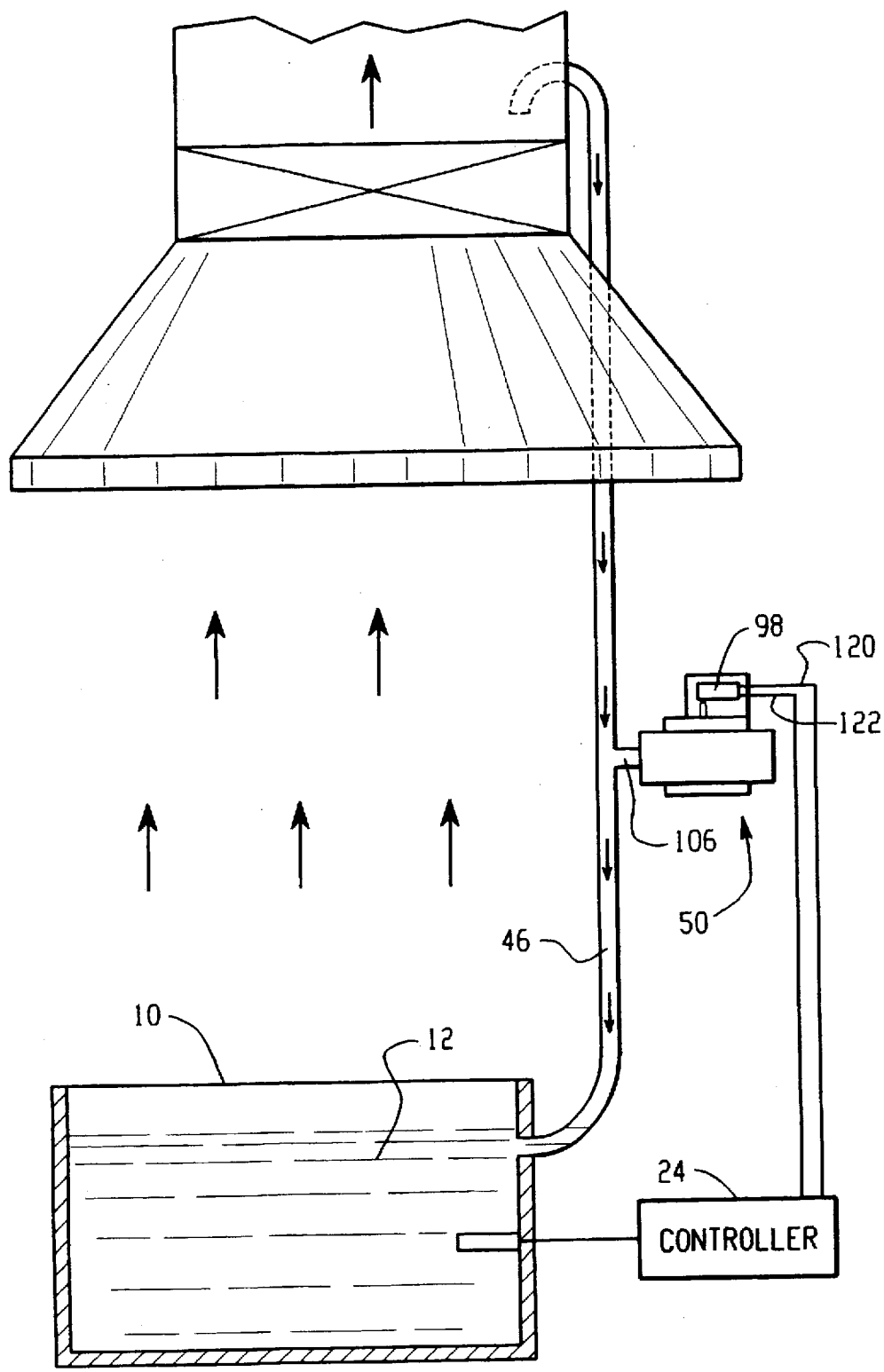

With reference to FIG. 6, in another alternate embodiment of the invention, the conduit 46 is disposed between the vat and the exhaust side of the exhaust fan 60. The end of the conduit disposed adjacent the exhaust fan is oriented so that air exhausted from the exhaust end of the fan enters the conduit and is urged towards the vat end of the conduit in a manner similar to the operation of blower 50 in FIG. 4. Utilizing the output of the exhaust fan in this manner permits the omission of blower 50 in FIG. 4 while realizing the benefits of the present invention.

Other connections of the end of the conduit opposite the vat are also possible. Specifically, the end of the conduit opposite the vat could be connected to the inlet side or outlet side of optional inducer 32 to provide the necessary vacuum or pressure respectively for operation of the present invention. Alternatively, the end of the conduit opposite the vat could be disposed transverse to the direction of air flow 62, such as air being exhausted by the exhaust fan 60, so that such moving air produces in the conduit a Venturi effect and a corresponding vacuum therein.

While the present invention has been described as being useable with air being directed into cooking medium it should be appreciated that it is desirable to avoid introducing cooking fumes, the byproduct of air-gas combustion and the like into the cooking medium. In this respect, it is preferable for air to be drawn away from the cooking medium, as set forth in conjunction with FIG. 1, rather than directing air into the cooking medium, as set forth in conjunction with FIG. 4. This, however, it not to be construed as limiting the invention.

The present invention has also been described in conjunction with the switch of FIGS. 2 and 3. From the foregoing, it should be appreciated that such switch converts the difference in pressure between the inside of the conduit and the outside of the conduit into a force useable for triggering the contacts of the microswitch. It should further be appreciated, however, that such difference in pressure is related to amount of air flowing in the conduit. Specifically, with the fan or blower operating, the lack of air flowing in the conduit produces the greatest difference in pressure between the inside of the conduit and the outside of the conduit. Conversely, a lesser difference in pressure exists when air flows in the conduit.

In accordance with an alternate embodiment of the invention, an air flow sensor may be utilized to determined air flow in the conduit. The lack of air flowing in the conduit, such as when cooking medium covers the vat end thereof, is interpreted by the controller as indication that sufficient cooking medium being present in the vat. A drawback of this embodiment, however, is that the vacuum source or pressure source not operating to produce a flow of air in the conduit would be also be interpreted by the controller as a indication that sufficient fluid is in the vat. In this respect, use of the switch of FIGS. 2 and 3 is preferable because the contacts of the microswitch are asserted only when the vacuum source or pressure source is operating in the presence of cooking medium covering the vat end of the conduit.

The present invention also finds application in apparatus other than cooking apparatus. Specifically, certain industrial applications require the use of chillers or cooling towers to remove unwanted heat from a process. Such chillers often include a blower or fan for forcing air across a radiator and a fluid pump for removing fluid by-products, such as condensate, water and the like, accumulated in a basin to a remote drain. In prior art chillers, a float and switch arrangement is provided for actuating the pump when sufficient fluid has accumulated in the basin. Like cooking apparatus, however, a problem with such float and switch arrangement is that it is often exposed to dirt, debris and the like which, over time, affect the operation thereof. The present invention, utilized in the manner illustrated in FIG. 5 for a cooking apparatus, provides for sensing when fluid in the basin is above a desired level. Specifically, one end of the conduit is positioned in the basin so that fluid in the basin blocks the end thereof when the fluid is at or above a level wherein it is desirable to have the pump move such fluid to the drain. The end of the conduit opposite the basin is disposed adjacent the air inlet side of the blower or fan of the chiller so that the inside of the conduit experiences a negative pressure at such end when the fan is operating. A pressure sensitive switch of the type shown in FIGS. 2 and 3 is disposed in the manner of the switch of FIG. 5, for sensing differences in pressure between the inside of the conduit and the outside of the conduit. The contacts of the pressure sensitive switch are connected for providing electrical energy to the fluid pump when the contacts of such switch are asserted. Operating the fan in the presence of fluid covering the end of the conduit positioned in the basin, causes the contacts of the pressure sensitive switch to change from a relaxed state to an asserted state thereby causing electrical power to be provided to the fluid pump. As the fluid in the basin decreases in response to the operation of the pump, air is drawn into the conduit. When sufficient air is drawn into the conduit so that the difference in air pressure between the inside and outside of the conduit is not sufficient to maintain the contacts in the asserted state, the contacts of the switch revert back to a relaxed state thereby causing electrical energy to be removed from the pump.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

Having described the preferred embodiment the invention is now claimed to be:

1. A cooking appliance comprising:
   a vessel for holding a quantity of a cooking medium;
   control means for controlling the operation of the cooking appliance; and
   level sensing means for sensing a level of the cooking medium disposed in said vessel, said level sensing means comprising:
   a conduit having an end in communication with the vessel for receiving cooking medium therein;
   flow generating means for generating an air flow in said conduit; and
   flow sensing means for sensing the amount of air flowing in said conduit and for providing a signal to the control means when the amount of air flowing in said conduit reaches a predetermined amount.

2. The cooking appliance as set forth in claim 1, wherein the amount of air flowing in said conduit is indicative of the level of the cooking medium relative to the end of the conduit in communication with the vessel.

3. The cooking appliance as set forth in claim 2, wherein a decrease in the level of the cooking medium relative to the end of the conduit in communication with the vessel causes an increase in the amount of air flowing in said conduit.

4. The cooking appliance as set forth in claim 2, wherein an increase in the level of the cooking medium relative to the end of the conduit in communication with the vessel causes a decrease in the amount of air flowing in said conduit.

5. The cooking appliance as set forth in claim 1, wherein said flow sensing means is a pressure sensitive switch means for sensing the difference between an internal pressure inside the conduit and an external pressure outside the conduit, wherein said internal pressure is functionally related to the amount of air flowing in said conduit.

6. The cooking appliance as set forth in claim 1, wherein said level sensing means provides the signal to the control means when the air flow in said conduit is substantially eliminated in response to cooking medium blocking the end of said conduit in communication with the vessel.

7. The cooking appliance as set forth in claim 1, wherein the cooking appliance is a deep fat fryer.

8. A fluid level sensor for sensing the level of a fluid in a vessel, comprising:
   flow generation means for generating an air flow;
   tube means having a first end in communication with the vessel for receiving said fluid therein, and a second end disposed adjacent to said flow generation means, wherein said flow generation means modifies the pressure inside said tube means; and
   pressure sensitive switch means operatively connected to said tube means for sensing a difference between the pressure inside said tube means and pressure outside said tube means, and for providing a signal when said sensed difference in pressure reaches a predetermined value.

9. The fluid level sensor as set forth in claim 8, wherein said predetermined value corresponds to said first end of said tube means being substantially unobstructed by said fluid.

10. The fluid level sensor as set forth in claim 8, wherein said difference in pressure decreases in response to a decreasing fluid level relative to the first end of said tube means.

11. The fluid level sensor as set forth in claim 8, wherein said predetermined value corresponds to said first end of said tube means being substantially obstructed by said fluid.

12. The fluid level sensor as set forth in claim 8, wherein said difference in pressure increases in response to an increasing fluid level relative to the first end of said tube means.

13. The fluid level sensor as set forth in claim 8, wherein said flow generation means creates a difference in pressure between the ends of said tube.

14. The fluid level sensor as set forth in claim 13, wherein the pressure difference between the ends of the conduit is not sufficient to create a flow of fluid in said tube means.

15. The fluid level sensor as set forth in claim 8 wherein said fluid is a cooking medium.

16. A method of sensing a level of a fluid disposed in a vessel, said method comprising:
   generating a difference in pressure between two ends of a conduit, wherein one end of the conduit is in communication with the vessel for receiving the fluid therein;
   sensing a difference between pressure inside the conduit and pressure outside the conduit; and
   providing an indication signal when said sensed difference reaches a predetermined pressure difference.

17. The method as set forth in claim 16, wherein said predetermined pressure difference corresponds to the flow of air in said conduit being substantially eliminated in response to the fluid substantially obstructing the end of said conduit in communication with the vessel.

18. A fluid sensor according to claim 1, wherein said flow generating means is an inducer blower for exhausting combustion by-products.

19. A fluid level sensor for sensing the level of a fluid contained in a vessel comprising:
   flow generation means for generating a flow of air;
   conduit means having a first end in communication with the vessel containing fluid, and a second end in communication with said flow generation means, wherein said flow generation means alters the pressure inside said conduit means to a pressure differing from atmospheric temperature;
   pressure sensing means for sensing a change in the pressure difference between the pressure inside said conduit means and the pressure outside said conduit means, said change in the pressure difference indicative of a change in the vessel from a first condition to a second condition.

20. A fluid sensor according to claim 19, wherein said first condition is the substantial obstruction of said first end of said conduit means by said fluid, and said second condition is the substantial unobstruction of said first end of said conduit means by said fluid.

21. A fluid sensor according to claim 19, wherein said first condition is the substantial unobstruction of said first end of said conduit means by said fluid, and said second condition is the substantial obstruction of said first end of said conduit means by said fluid.

22. A fluid level sensor for sensing the level of a fluid in a vessel, comprising:
   a flow generating device for generating an air flow;
   a tube member having a first end in communication with the vessel for receiving said fluid therein, and a second end disposed adjacent to said flow generating device, wherein said flow generating device modifies the pressure inside said tube; and
   a pressure sensitive switch operatively connected to said tube member for sensing a difference between the pressure inside said tube member and pressure outside said tube member, and for providing a signal when said sensed difference in pressure reaches a predetermined value.

23. A fluid level sensor for sensing the level of a fluid contained in a vessel comprising:

a flow generating device for generating a flow of gas;

a conduit having a first end in communication with the vessel containing fluid, and a second end in communication with said flow generating device, wherein said flow generating device alters the pressure inside said conduit to a pressure differing from atmospheric temperature;

a pressure sensor for sensing a change in the pressure difference between the pressure inside said conduit and the pressure outside said conduit, said change in the pressure difference indicative of a change in the vessel from a first condition to a second condition.

24. A fluid sensor according to claim 19, wherein said first condition is the substantial obstruction of said first end of said conduit by said fluid, and said second condition is the substantial unobstruction of said first end of said conduit by said fluid.

25. A fluid sensor according to claim 19, wherein said first condition is the substantial unobstruction of said first end of said conduit by said fluid, and said second condition is the substantial obstruction of said first end of said conduit by said fluid.

\* \* \* \* \*